(12) United States Patent
Yanagisawa

(10) Patent No.: US 6,860,607 B2
(45) Date of Patent: Mar. 1, 2005

US006860607B2

(54) INTEGRATOR TYPE ILLUMINATION OPTICAL SYSTEM AND PROJECTOR HAVING THE SAME

(75) Inventor: Hirotaka Yanagisawa, Matsumoto (JP)

(73) Assignee: Seiko Epson Corporation, Toyko (JP)

( * ) Notice: Subject to any disclaimer, the term of this patent is extended or adjusted under 35 U.S.C. 154(b) by 0 days.

(21) Appl. No.: 10/377,766

(22) Filed: Mar. 4, 2003

(65) Prior Publication Data

US 2003/0174294 A1 Sep. 18, 2003

(30) Foreign Application Priority Data

Mar. 15, 2002 (JP) .......................... 2002-071284

(51) Int. Cl.[7] .................. G03B 21/14; G03B 21/20; F21V 5/00
(52) U.S. Cl. .................. 353/38; 353/102; 362/331
(58) Field of Search .................. 353/20, 38, 102; 362/330, 331, 336

(56) References Cited

U.S. PATENT DOCUMENTS

| 5,871,266 A | * | 2/1999 | Negishi et al. ............ 353/102 |
| 6,273,569 B1 | | 8/2001 | Iechika et al. ............. 353/38 |
| 6,523,962 B2 | * | 2/2003 | Yajima ...................... 353/20 |
| 6,631,039 B2 | * | 10/2003 | Fujimori et al. ........... 362/331 |

* cited by examiner

*Primary Examiner*—Christopher Mahoney
(74) *Attorney, Agent, or Firm*—Oliff & Berridge, PLC (57) ABSTRACT

An integrator type illumination optical system has a first lens array and a second lens array. The first lens array includes left, center, and right column groups. The thickness of the lens cells of the center column group is thinner than that of the lens cells in other column groups, and the thickness of the lens cells in the left and right column groups increases from the inner column outward gradually. The lens cells in the left and right column groups are shaped to converge incident light away from the optical axis of the integrator type illumination optical system, and the lens cells in the center column group are shaped to converge incident light toward the optical axis of the integrator type illumination optical system.

17 Claims, 7 Drawing Sheets

IMAGE FORMED BY LENS CELLS IN LEFT COLUMN GROUP
IMAGE FORMED BY LENS CELLS IN CENTER COLUMN GROUP
IMAGE FORMED BY LENS CELLS IN RIGHT COLUMN GROUP

INTEGRATOR TYPE ILLUMINATION OPTICAL SYSTEM AND PROJECTOR HAVING THE SAME

BACKGROUND OF THE INVENTION

1. Field of the Invention

The present invention relates to an integrator type illumination optical system for increasing efficiency of light utilization, and to a projector having the same.

2. Description of the Related Art

Figure 9:
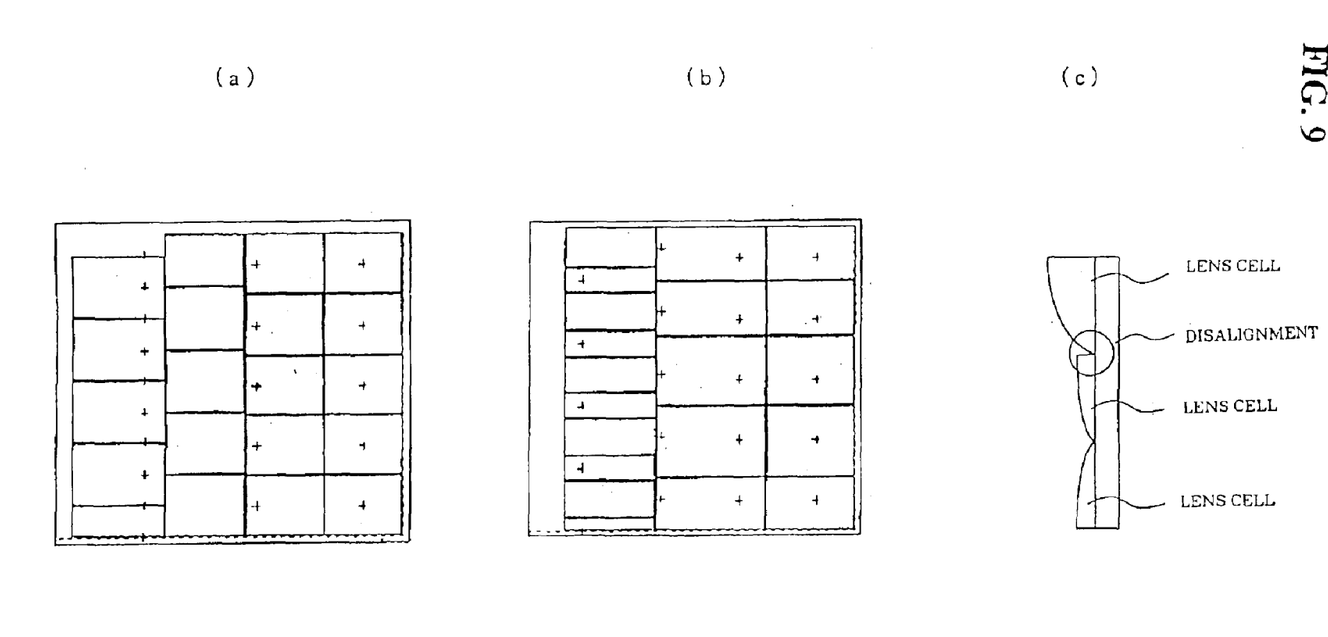
FIG. 9 is an explanatory drawing showing a first and a second lens arrays of a nested construction in the related art.

In an illumination optical system utilizing a polarizing element (or an apparatus), an integrator type illumination optical system is employed in order to utilize light as efficiently as possible. The integrator type illumination optical system includes a first lens array having a plurality of lens cells in a similar rectangular shape to that of a display surface (or a light incidence plane) of an illuminated object, such as a liquid crystal panel, and a second lens array for forming images of the respective lens cells of the first lens array on the illuminated object. Therefore, the second lens array includes a plurality of lens cells corresponding to the lens cells of the first lens array. Recently, in order to further increase efficiency of light utilization, a lens array having a nested construction as shown in FIG. 9 has been utilized. FIG. 9A shows one-fourth of the first lens array, and FIG. 9B shows one-fourth of the second lens array. The nested lens array is constructed in such a manner that the optical axes of lens cells constituting the first and the second lens arrays are arranged and decentered so as to pass through the positions of plus signs shown in FIG. 9 in order to utilize a light emitted form a light source as efficiently as possible.

Te nested lens array as described above is effective for increasing efficiency of light utilization. However, since there exist disalignments at contact points between surfaces of curvature of the lens cells as shown in FIG. 9C, its shape is obliged to be complex. Such lens array has a tendency to generate display shadows caused by such disalignments. In addition, since an advanced technology to prevent "chamfer" that may cause lowering of luminance of illumination from occurring at these disalignments is required for manufacturing the lens array, manufacturers that can manufacture such lens array are limited, and thus the manufacturing costs disadvantageously increases.

SUMMARY OF THE INVENTION

In view of such problems, it is an object of the invention to provide an integrator type illumination optical system and a projector that can prevent generation of display shadows or lowering of luminance of illumination may be achieved at a low cost while maintaining the efficiency of light utilization at a high level.

An integrator type illumination optical system of the invention includes a first lens array consisting of a plurality of lens cells arranged into a matrix in a column direction and a line direction, a second lens array consisting of a plurality of lens cells, which correspond to the respective lens cells of the first lens array, arranged into a matrix in a column direction and the line direction, and a polarizing element including a polarized beam splitter for converting light passing through the first and the second lens arrays into polarized beams and a polarization conversion element for converting the polarized beams into a beam having a uniform direction of polarization, wherein the first lens array is constituted by three column groups consisting of a left column group, a center column group and a right column group, the thickness of the lens cells included in the center column group is thinner than that of the lens cells included in other column groups, the lens cells included in the left column group and the right column group are formed such that the thickness of the lens cells in each column group increases gradually from the innermost column to the outermost columns in each group. In this arrangement, difference of thicknesses between the columns of the lens cells constituting the lens array may be reduced without lowering the efficiency of light utilization, and thus the disalignments between the lens cells are almost eliminated, thereby generation of display shadows and occurrence of chamfers during manufacturing the lens arrays may be prevented. The respective lens cells of the second lens array have such shapes that are capable of forming images of the respective lens cells of the first lens array on the object to be illuminated.

The integrator type illumination optical system described above may be constructed in such a manner that the lens cells in the left column group and in the right column group have shapes to converge incident light in the direction away from the optical axis of the integrator type illumination optical system and lens cells in the center column group have shapes to converge incident light toward the optical axis of the integrator type illumination optical system.

In the integrator type illumination optical system described above, the lens cells that constitute the first and the second lens arrays are constructed in such a manner that the adjacent lens cells are in contact with each other on their surfaces of curvature. As a consequence, the disalignments between the lens cells may be eliminated, and thus generation of display shadows and occurrence of chamfers during manufacturing lens arrays may reliably be prevented.

In the integrator type illumination optical system described above, the center column group of the first lens array consists of two columns, each of the left and right column groups consist of two columns of an outer column and an inner column arranged respectively on outer side and inner side of the first lens array, and the optical axis of each lens cell constituting each outer column in the left column group and the right column group passes through a position apart outside from the center of the lens cell, the optical axis of each lens cell constituting each inner column in the left column group and the right column group passes through a position on the adjacent lens cell in the respective outer column and apart inside from the center of the adjacent lens cell, and the optical axis of the lens cell in the center column group passes through a position apart inside from the center of the lens cell. By employing such arrangement for the first lens array, an integrator type illumination optical system of high luminance and high reliability may be obtained easily at lower costs in comparison with the first lens array in the nested construction in the related art.

In the integrator type illumination optical system, the width of each lens cell constituting inner columns of the second lens array, which corresponds to the inner columns in the left column group and the right column group of the first lens array, are larger than the widths of the lens cells constituting adjacent lens columns of the second lens array. Accordingly, the efficiency of light utilization of the integrator type illumination optical system may further be improved.

In the integrator type illumination optical system described above, the optical axis of each lens cell constituting outer columns of the second lens array, which corresponds to the outer columns of the first lens array, passes through a position apart inside from the center of the lens cell, the optical axis of each lens cell constituting inner columns of the second lens array, which corresponds to the inner columns of the first lens array, passes through a position apart inside from the centers of the lens cell, and the optical axis of each lens cell in a center column group of the second lens array, which corresponds to the center column group of the first lens array, passes through a position apart outside from the centers of the lens cell. The second lens array in this arrangement may be manufactured more easily at less cost in comparison with the second lens array of the nested construction in the related art.

Furthermore, the projector of the invention includes any one of the integrator type illumination optically system described above, a light modulation system for modulating light in accordance with image information, and a superimposed lens for superimposing the respective lights projected from the respective lens cells of the second lens array on the light incidence plane of the light modulation unit. Accordingly, a projector of high-luminance and of high-reliability may be obtained at low costs.

DESCRIPTION OF THE PREFERRED EMBODIMENTS

First Embodiment

Figure 1:
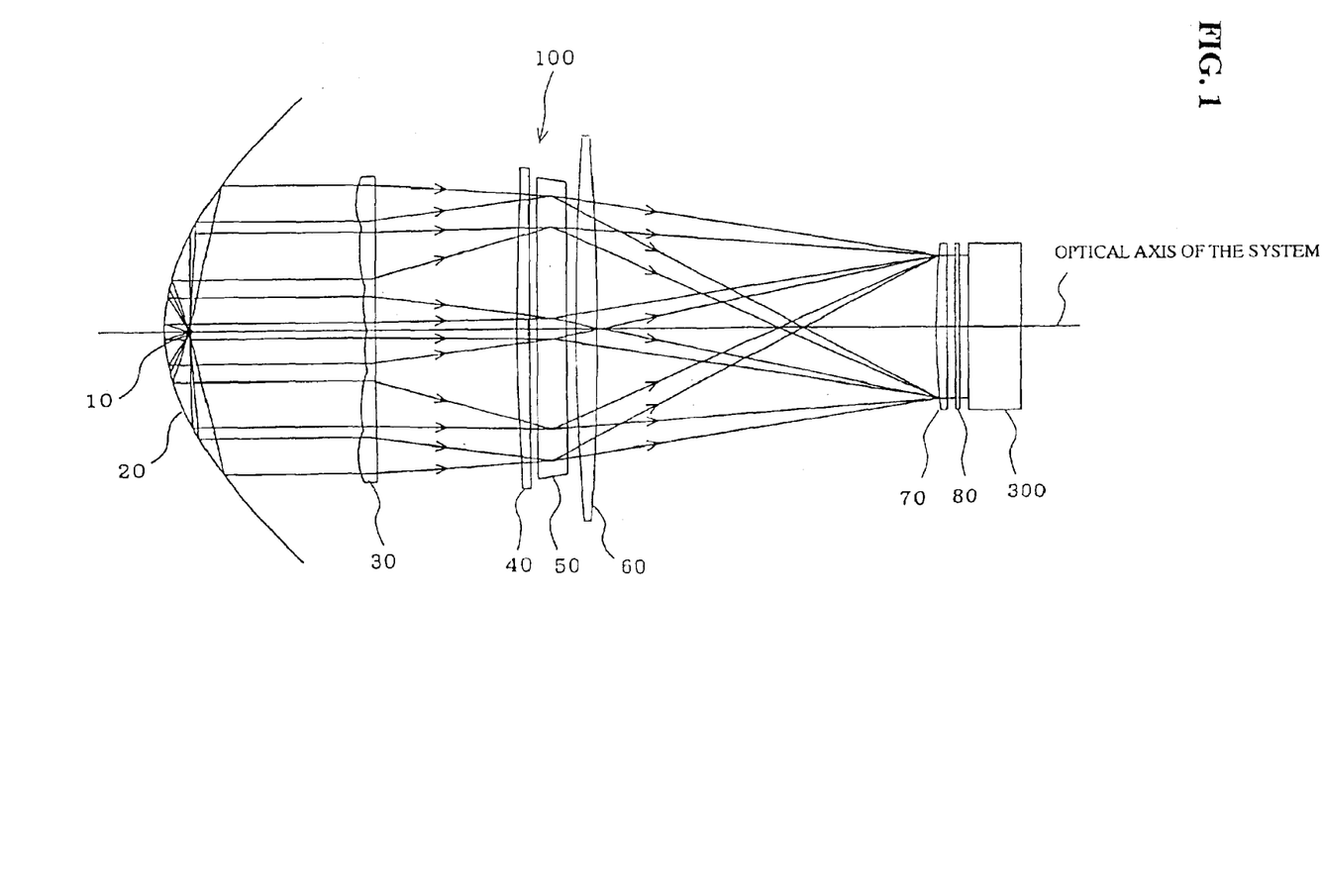
FIG. 1 is an explanatory drawing illustrating a construction and an operation of an integrator type illumination optical system according to an embodiment of the invention.
Figure 2:
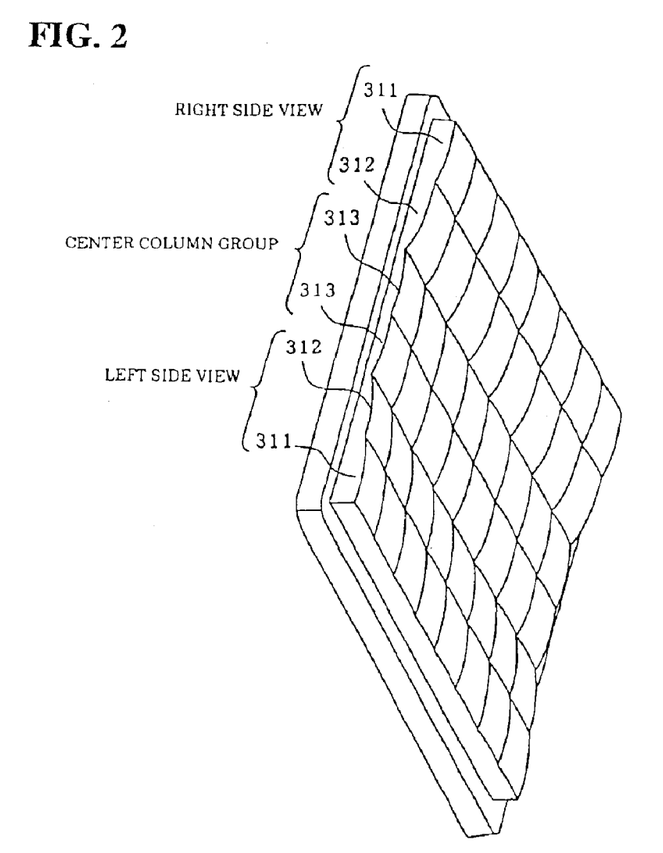
FIG. 2 is a perspective view showing the shape of a first lens array in FIG. 1.
Figure 3:
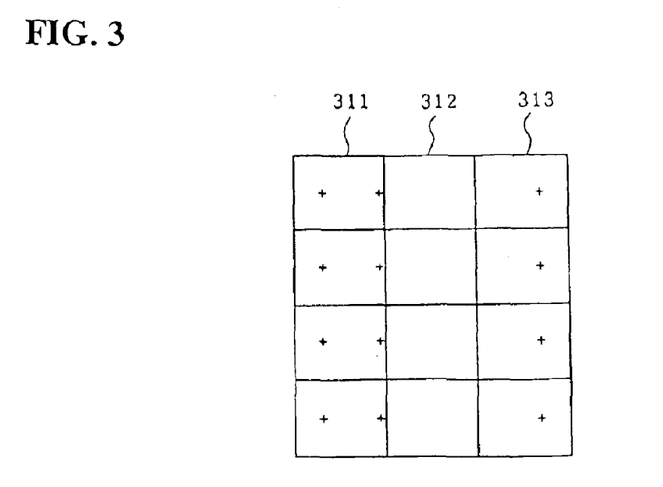
FIG. 3 is a front view showing positions of optical axes of the respective lens cells that constitute the first lens array.
Figure 4:
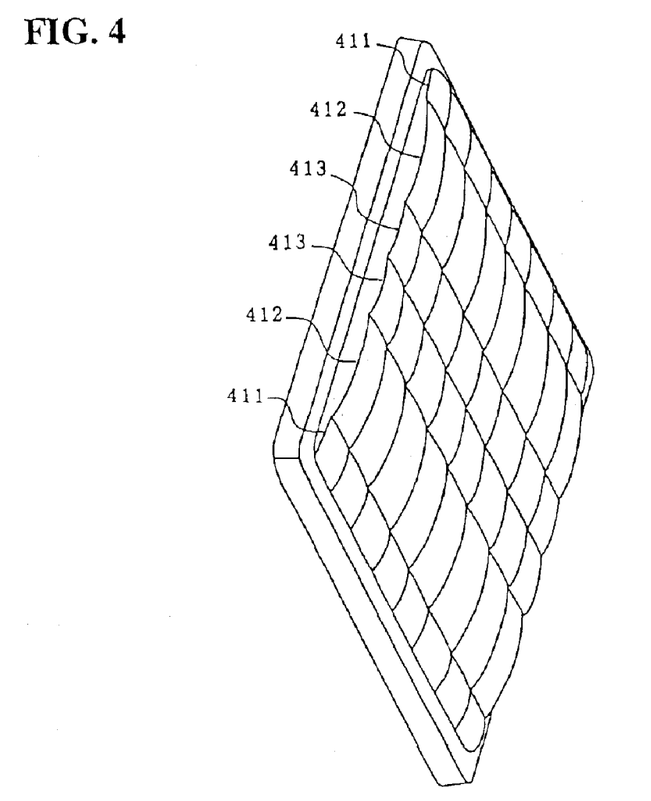
FIG. 4 is a perspective view showing the shape of a second lens array in FIG. 1.
Figure 5:
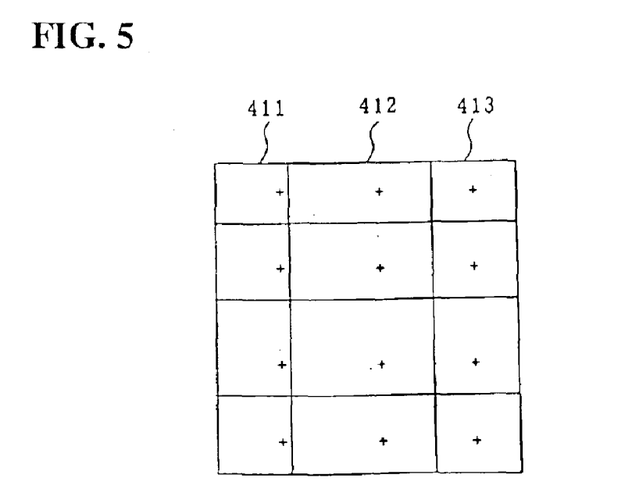
FIG. 5 is a front view showing positions of optical axes of the respective lens cells that constitute the second lens array.
Figure 6:
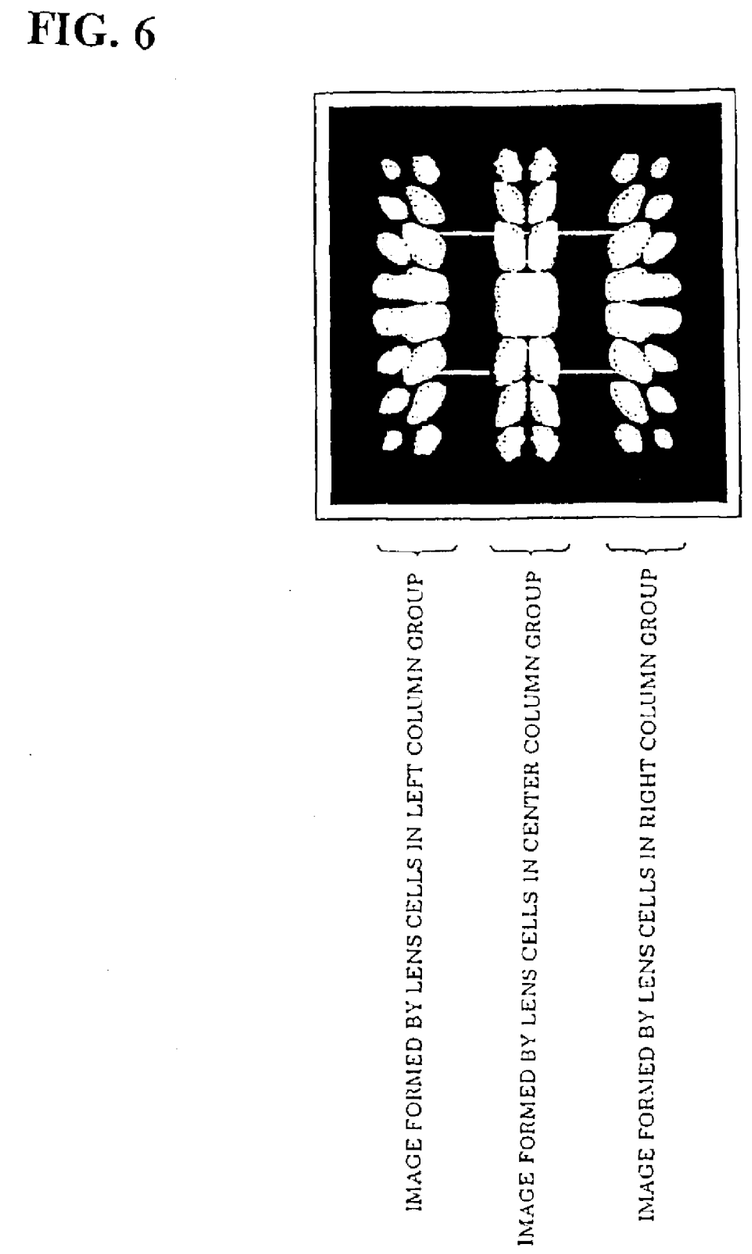
FIG. 6 is a front view showing an image of the light source formed on a polarizing element 50 by light passed through the first and the second lens arrays.
Figure 7:
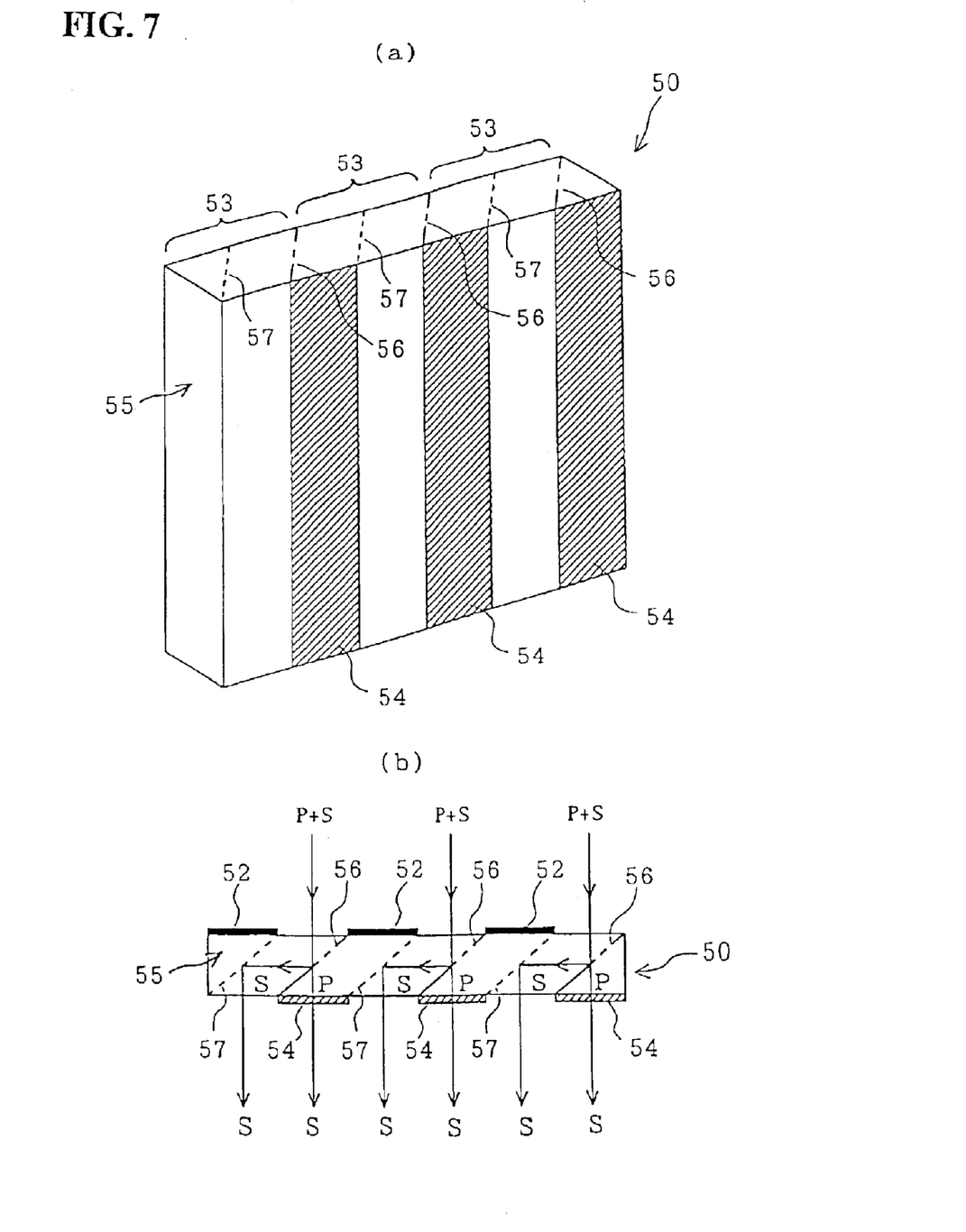
FIG. 7 is a perspective view showing a construction of the polarizing element in FIG. 1.

FIG. 1 is an explanatory drawing illustrating a construction and an operation of an integrator type illumination optical system according to an embodiment of the invention; FIG. 2 is a perspective view showing the shape of a first lens array in FIG. 1; FIG. 3 is a front view showing positions of optical axes of the respective lens cells that constitute the first lens array; FIG. 4 is a perspective view showing the shape of a second lens array in FIG. 1; FIG. 5 is a front view showing positions of optical axes of the respective lens cells that constitute the second lens array; FIG. 6 is a front view of a light source image on a polarizing element 50 converged by the first lens array; and FIG. 7 is a perspective view showing a construction of a polarizing element in FIG. 1.

An integrator type illumination optical system 100 in this embodiment includes, as shown in FIG. 1, a lamp 10 that corresponds to a light source, a reflector 20 having a reflecting surface of elliptical or parabolic shape for reflecting light from the lamp 10 in a predetermined direction, a first lens array 30 including a plurality of lens cells arranged into a matrix in a column direction and a line direction for dividing the light from the lamp 10 and the reflector into a plurality of light fluxes, a second lens array 40 including the number of lens cells corresponding to the lens cells of the first lens array 30 arranged into a matrix in the column direction and the line direction, a polarizing element 50 for making polarized light having a uniform direction of polarization from the light passing through the first and the second lens arrays 30 and 40, and a superimposed lens 60 for superimposing a plurality of light fluxes projected from the polarizing element 50 onto a light incidence plane of an object to be illuminated. In this embodiment, the object to be illuminated is a liquid crystal panel 300, which is provided with a field lens 70 and a polarizing plate 80 on the light entering side thereof.

The first lens array 30 includes a left column group, a center column group and a right column group. The thickness of the lens cells included in the center column group is thinner than that of the lens cells included in other column groups, and the thickness of the lens cells in the left column group and the right column group is formed such that it increases gradually from the innermost column to the outermost column in each group. In the first lens array, the left and right columns are formed symmetrically with respect to the centerline thereof. Preferably, the thicknesses of the respective lens cells constituting the first lens array 30 are such that the surfaces of curvature of the respective lens cells are directly abut with each other without disalignments therebetween.

In this embodiment, the first lens array 30 is arranged in a matrix of 6 columns×8 rows, where the group of vertically arranged lens cells is referred to as column, and the grope of laterally arranged lens cells is referred to as row. However, the arrangement of the lens cells in the invention is not limited to 6 columns×8 rows. Each lens cell has the same aspect ratio as the light incidence plane of the liquid crystal panel 300. Two columns of lens cells 313 and 313 at the center of the first lens array 30 are the smallest in thickness, and the lens cells 311 and 312 in the-two column groups on the right side and on the left side are such that the thickness increases gradually from the inner column to the outer column. In other words, the surfaces of curvature of the two columns of lens cells 313 and 313 at the center form a valley as a whole, and the surfaces of curvature of the two columns of lens cells 312 and 311 on the left side rise gently from the end of the valley outward to form a gentle ridge line on one side as a whole, and the surfaces of curvature of the two columns of lens cells 312 and 311 on the right side rise gently to form a gentle ridge line on the other side as a whole.

The optical axes of the respective lens cells of the first lens array 30 are, as shown in a front view of one-fourth of the first lens array 30 in FIG. 3, such that the optical axes of the lens cells 311 of the outer columns in the left column group and in the right column group are positioned outside the centers of the lens cells 311 of the outer columns, the optical axes of the lens cells 312 of the inner columns in the left column group and the right column group are positioned on the inner sides of the lens cells 311 of the outer columns, and the optical axes of the lens cells 313 of the center columns are positioned inside the centers thereof.

The second lens array 40 serves to collimate a plurality of angled light fluxes projected from the first lens array 30 and guide the same to enter into the polarizing element array 50. Therefore, when the construction of the first lens array 30 is determined, the construction of the second lens array 40 is determined correspondingly. The second lens array 40 of this embodiment is, as shown in FIG. 4, constructed of lens cells arranged in a matrix of 6 columns×8 rows corresponding to the first lens array 30. The respective lens cells of the second lens array correspond to the respective lenses of the first lens array 30 one-to-one basis. Lens cells 411 of the leftmost column and in the rightmost column are the smallest in thickness, and lens cells of other columns-are generally the same in thickness. The widths of lens cells 412 of the second outermost columns are larger than the widths of the adjacent lens cells 411 and 413 and are divided so as to surround a light source image shown in FIG. 6. The second lens array 40 is formed to be symmetrical with respect to the centerline thereof. The mating surfaces of the respective lens cells between the columns and rows constituting the second lens array 40 are preferably formed so that the surfaces of curvature of the respective lens cells come into abutment directly with each other without disalignments.

The optical axes of the respective lens cell of the second lens array 40 are, as shown in the front view of one-fourth of the second lens array 40 in FIG. 5, the optical axes of the lens cells 411 of the outer column of the second lens array 40 corresponding to the lens cells 311 of the outer column of the first lens array 30 are positioned inside the lens cells 411, the optical axes of the lens cells 412 of the inner column of the second lens array 40 corresponding to the lens cells 312 of the inner column of the first lens array 30 are positioned inside the centers of the lens cells 412, and the optical axes of the lens cells 413 in the center column group of the second lens array 40 corresponding to the lens cells 313 in the center column group of the first lens array 30 are positioned outside the centers of the lens cell 413.

With the first lens array 30 and the second lens array 40, the light source image of the lamp 10 forms images at the left and right ends and near the center of the polarizing element 50, and the formed images are as shown in FIG. 6. In other words, images generated by the two columns of the lens cells 313, 313 in the center column group of the first lens array 30 are formed in bunches in the vertical direction of the polarizing element 50 centered on the optical axis of the integrator type illumination optical system (at the center of FIG. 6), and images generated by the two columns of lens cells 311, 312 in the left column group or the right column group of the first lens array 30 are formed in bunches respectively in the vertical direction of the left and right end of the polarizing element 50 away from the optical axis of the integrator type illumination optically system.

In addition, the polarizing element 50 has a construction as shown in FIG. 7A. In other words, it includes a λ/2 wave plate 54 (λ represents a wave length) selectively disposed at a part of the light projecting surface. A polarized beam splitter 53 has such construction that a plurality of light translucency members 55 in the shape of a column of parallelogram in cross section are bonded in order. The interfaces of the adjacent light translucency members 55 are formed with polarized light separating films 56 and reflecting films 57 alternately. The λ/2 wave plate 54 is selectively attached on one of the light projecting surfaces of the polarized light separating film 56 or the reflection film 57. In this example, the λ/2 wave plates 54 are bonded on the light projecting surfaces of the polarized light separating films 56.

The polarizing element 50 projects the incident light fluxes in alignment with one type of polarized light (for example, s-polarized light or p-polarized light) as shown in FIG. 7B. In other words, when a non-polarized light including the s-polarized light component and p-polarized light component (incident light having random polarizing directions) is entered into the incidence plane of the polarizing element 50, the incident light is separated into the s-polarized light and the p-polarized light by the polarized light separating films 56 in a first stage. The s-polarized light is reflected almost vertically by the polarized light separating films 56, then further reflected by the reflection films 57, and finally projected. On the other hand, the p-polarized light is transmitted through the polarized light separating films 56 as is. Disposed on the projecting surface of the p-polarized light that passed through the polarized light separating films 56 is the λ/2 wave plates 54, through which the p-polarized light is converted into the s-polarized light and projected. Therefore most part of the light passed through the polarizing element 50 is projected as the s-polarized light. In order to project the light as the p-polarized light from the polarizing element 50, the λ/2 wave plates 54 must simply be disposed on the projecting surfaces through which the s-polarized light reflected from the reflection films 57 is projected. As far as the direction of polarization can be aligned into one direction, the λ/4 wave plates may be used, or a desired wave plates-may be provided on the projecting surfaces of both of the p-polarized light and s-polarized light. On the front surface of the polarizing element, light blocking plates 52 for allowing the light to enter only through the portions of the light incidence plane corresponding to the polarized light separating films 56 are normally provided.

In this illumination optical system, since an image of the lamp 10 that corresponds to a light source formed by having passed through the first and the second lens arrays 30 and 40 are divided into three parts at more or less regular intervals as shown in FIG. 6, the light incidence portion of the polarizing element 50 must simply be provided on three sections correspondingly. One polarized light separating film 56 may be enough for every light incidence portion, and thus three films in total must simply be provided. In addition, two polarizing elements are disposed symmetrically with respect to the optical axis of the system in the related art, in this embodiment, only one polarizing element 50 having the polarized light separating films 56 disposed in the same direction is sufficient. Since only lights having aligned in the direction of polarization enter into the polarizing plate on the light incident side (represented by numeral 80 in FIG. 1) of the liquid crystal panel 300 owing to this polarizing element 50, the light may be efficiently utilized. In addition, since the amount of light entering into the polarizing plate on the incident side without being converted in polarization in this illumination system is smaller than those in the related art, heat generation is suppressed, which contributes to elongation of the life of the polarizing plate.

With such integrator type illumination optical system 100 including the lamp 10, the reflector 20, the first lens array 30, the second lens array 40, and the polarizing element 50, the difference in lens thickness between the lens cells in the adjacent columns that constitutes a lens array may be reduced without lowering the efficiency of light utilization, whereby the disalignments between lens cells in outer three column groups are reduced and generation of display shadows and occurrence of chamfers during manufacturing the lens arrays may be reduced.

Embodiment 2

An embodiment of the projector provided with the above-described integrator type illumination optical system 100 will now be described. The projector of this embodiment includes, as shown in a block diagram of the optical system in FIG. 8, the integrator type optical system 100, a light color separating optical system 200, liquid crystal panels 300 (300R, 300G, 300B), a cross dichroic prism 400, and a projection lens 500.

Figure 8:
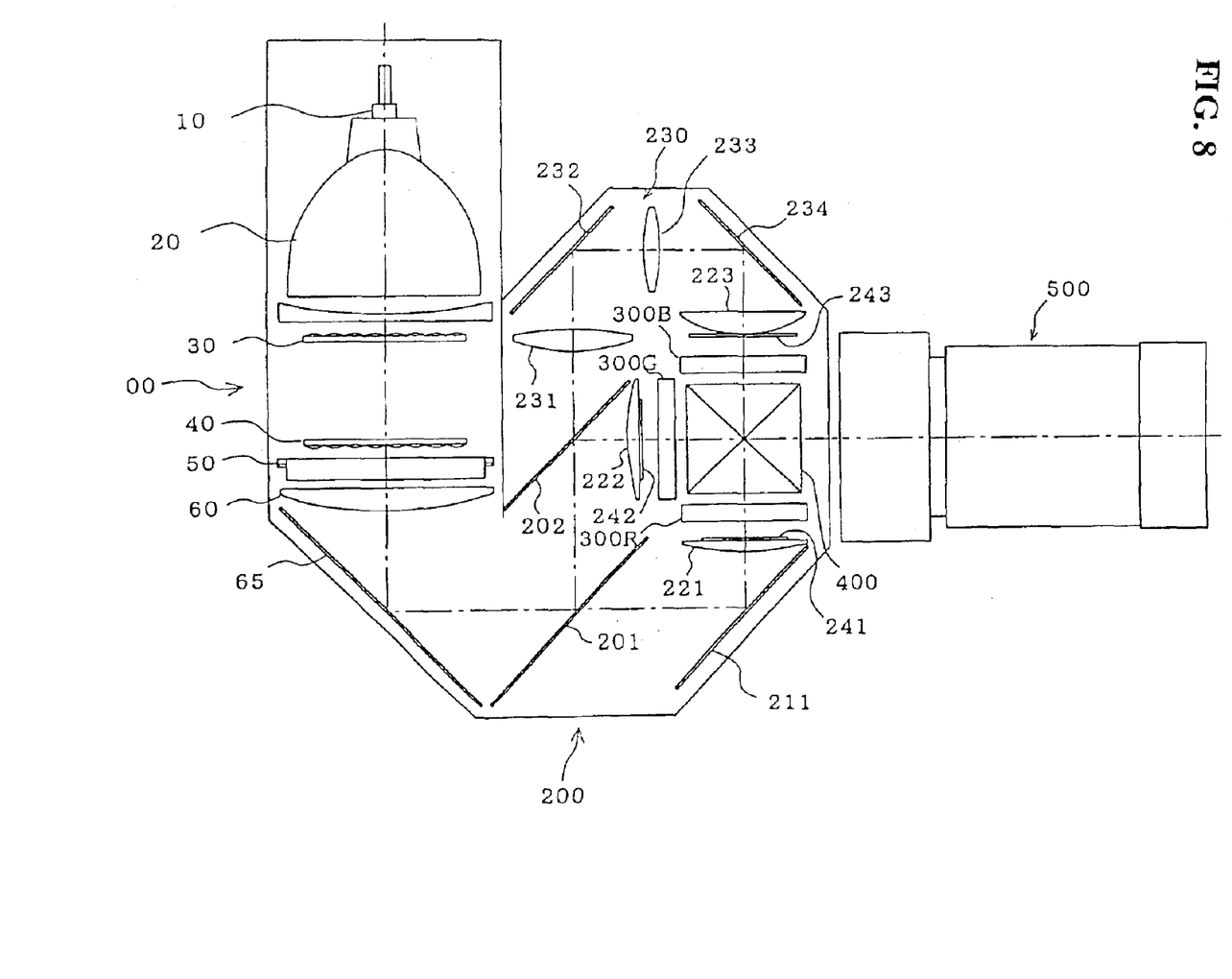
FIG. 8 is a plan view showing a construction of an optical system of a projector according to the invention.

The light color separating optical system 200 includes a first and a second dichroic mirrors 201 and 202 for separating light projected from the illumination optical system 100 into red light, green light and blue light. The first dichroic mirror 201 transmits a red light component of light projected from the illumination optical system 100, and reflects a blue light component and a green light component. The red light passed through the first dichroic mirror 201 is reflected from the reflecting mirror 211, passes through a field lens 221, and reaches the liquid crystal panel 300R for red light. The field lens 221 collimates the respective light fluxes projected from the superimposed lens 60 in parallel with the center axis (main light beam). Field lenses 222 and 223 provided in front of other liquid crystal panels 300G and 300B act in the same manner.

Out of blue light and green light reflected from the first dichroic mirror 201, the green light is reflected from the second dichroic mirror 202, is passed through the field lens 222 and reaches the liquid crystal panel 300G for green light. On the other hand, the blue light passes through the second dichroic mirror 202, passes through a relay optical system 230 including an incident lens 231, a reflecting mirror 232, a relay lens 233, and a reflecting mirror 234, further through the field lens 223, and reaches the liquid crystal panel 300B for blue light.

The liquid crystal panels 300R, 300G and 300B serve as a space light modulation unit for modulating incident light based on given image information, which include a TFT (Thin Film Transistor) type liquid crystal panel and TFD (Thin Film Diode) type liquid crystal panel. Disposed on the light incidence planes of the liquid crystal panels 300R, 300G and 300B are polarizing plates 241, 242 and 243.

The cross dichroic prism 400 is a prism for combining modulation lights in red, green and blue to form a color image. The cross dichroic prism 400 is formed with a dielectric multilayer film that reflects red light and a dielectric multilayer film that reflects blue light on the interfaces between four rectangular prisms in a substantially X-shape. The modulation lights in three colors are combined by these dielectric multilayer films and a combined light for projecting a color image is formed. The liquid crystal panels 300R, 300G and 300B are fixed to the cross dichroic prisms 400, so as to be accurately positioned while combining the respective colors.

The projection lens 500 serves to project a combined light combined by the cross dichroic prism 400 on a projection screen to display a color image on the screen.

The projector constructed as described above operates as follows.

Light emitted from the lamp 10 is reflected from the reflector 20 and enters into the first lens array 30. Then, the first lens array 30 divides the entered light into a plurality of partial light fluxes by the respective lens cells, directs the lights entered into the lens cells 311 and 312 in the leftmost two columns leftward away from the optical axis of the integrator type optical system, directs the light entered into the lens cells 311 and 312 in the rightmost two columns rightward away from the optical axis of the integrator type optical system, and directs the light entered into the lens cells 313 and 313 of the center two columns toward the optical axis of the integrator type optical system.

The respective light fluxes divided by the first lens array 30 as described above are converged near the polarized light separating films 56 on the polarizing element 50 by the second lens array 40. The plurality of partial light fluxes entered into the polarizing element 50 are separated into two types of polarized lights at the polarized light separating films 56 and one of the polarized lights is aligned with a polarized light that is the same type as the other polarized light using the wave plate 54, and the lights aligned in the direction of polarization are projected from the polarizing element 50. The plurality of partial light fluxes projected from the polarizing element 50 are adjusted by the superimposed lens 60 so that the directions of travel of the lights are superimposed with each other on the light incidence planes of the liquid crystal panels 300R, 300G and 300B, and are entered into the colored light separation optical system 200 through the reflection mirror 65 (which is not necessary when there is no need to refract the light). Then, the respective colored lights separated there further enter into the light incidence planes of the respective liquid crystal panels 300R, 300G and 300B.

As described above, the red, green and blue light fluxes entered into the liquid crystal panels 300R, 300G and 300B respectively are modulated there based on image information and then enter into the cross dichroic prism 400. These colored lights being combined in the cross dichroic prism 400, form a color image, which is projected from the projection lens 500.

In the projector constructed as described above, since the effect of the integrator type illumination optical system described above is effective as is, a projector of a high luminance and high reliability may be obtained at low costs.

The invention is not limited to the embodiments described above, and various modifications may be made without departing the scope of the invention. For example, the following modification is also applicable.

For example, although the liquid crystal panel is used as a light modulating unit in the above-described embodiment, other light modulating units may be employed. The light modulating unit may be, for example, a micro-mirror element having minute mirror of silicon disposed two-dimensionally.

In the embodiment described above, the projector employs three liquid crystal panels. However, the invention may be applied to projectors employing one, two, four or more liquid crystal panels. When only one liquid panel is provided, color filters for passing colored light in red, green, and blue respectively are generally employed instead of the light separating optical system described above.

In addition, in the embodiment described above, the invention is applied to the projector employing transmission type liquid crystal panel. However, the invention may also be applied to a projector employing a reflecting type liquid crystal panel. Here, "transmission type" means that the liquid crystal panel is a type that transmits light, and "reflecting type" means that the liquid crystal panel is a type that reflects light.

In the projector employing a reflecting type liquid crystal panel, the dichroic prism is used as a colored light separating unit that separates incoming light into red, green, and blue lights as well as a colored light combining unit that combines the modulated lights in three colors and projects in the same direction.

There are a front projector that projects incoming light in the direction of viewing the projected image and a rear projector that projects incoming light in the direction opposite from the direction of viewing the projected image. The invention may be applied any of these projectors.

According to the integrator type illumination optical system and the projector of the invention, reduction of generation of display shadows or lowering of luminance may be achieved at low costs.

What is claimed is:

1. An integrator type illumination optical system comprising:
    a first lens array consisting of a plurality of lens cells arranged into a matrix in a column direction and a line direction,
        wherein the first lens array is constituted by three column groups consisting a left column group, a center column group and a right column group,
    the thickness of the lens cells included in the center column group is thinner than that of the lens cells included in other column groups,
    the lens cells included in the left column group and the right column group are formed such that the thickness of the lens cells in each column group increases gradually from the innermost column to the outermost column in each group,
    respective lens cells of a second lens array have shapes that are capable of forming images of the respective lens cells of the first lens array on the object to be illuminated, and
    the first and the second lens arrays are formed in such a manner that the adjacent lens cells constituting the first and the second lens arrays are in contact with each other on their surfaces of curvature.

2. The integrator type illumination optical system according to claim 1, wherein the lens cells in the left column group and in the right column group have shapes to converge incident light in the direction away from an optical axis of the integrator type illumination optical system and lens cells in the center column group have shapes to converge incident light toward the optical axis of the integrator type illumination optical system.

3. The integrator type illumination optical system according to claim 2, wherein the center column group of the first lens array consists of two columns, each of the left and right column groups consists of two columns of an outer column and an inner column arranged respectively on outer side and inner side of the first lens array, an optical axis of each lens cell constituting each outer column in the left column group and the right column group passes through a position apart outside from a center of the lens cell, an optical axis of each lens cell constituting each inner column in the left column group and the right column group passes through a position on an adjacent lens cell in respective outer column and apart inside from a center of the adjacent lens cell, and an optical axis of each lens cell in the center column group passes through a position apart inside from a center of the lens cell.

4. A projector comprising:
    an integrator type illumination optical system according to claim 2; and
    a light modulation unit for modulating light in accordance with image information,
    wherein respective lights projected from the respective lens cells of the second lens array are superimposed on the light incidence plane of the light modulation unit.

5. The integrator type illumination optical system according to claim 1, wherein the center column group of the first lens array consists of two columns, each of the left and right column groups consists of two columns of an outer column and an inner column arranged respectively on outer side and inner side of the first lens array, an optical axis of each lens cell constituting each outer column in the left column group and the right column group passes through a position apart outside from a center of the lens cell, an optical axis of each lens cell constituting each inner column in the left column group and the right column group passes through a position on an adjacent lens cell in respective outer column and apart inside from a center of the adjacent lens cell, and an optical axis of each lens cell in the center column group passes through a position apart inside from a center of the lens cell.

6. The integrator type illumination optical system according to claim 5, wherein the width of each lens cell constituting inner columns of the second lens array, which correspond to the inner columns in the left lens column group and the right lens column group of the first lens array, is larger than the width of each lens cell constituting adjacent lens columns of the second lens array.

7. The integrator illumination optical system according to claim 6, wherein an optical axis of each lens cell constituting outer columns of the second lens array, which correspond to the outer columns of the first lens array, passes through a position apart inside from a center of the lens cell, an optical axis of each lens cell constituting inner columns of the second lens array, which correspond to the inner columns of the first lens array, passes through a position apart inside from a center of said lens cell, and an optical axis of each lens cell in a center column group of the second lens array, which correspond to the center column group of the first lens array, passes through a position apart outside from a center of the lens cell.

8. A projector comprising:
    an integrator type illumination optical system according to claim 7; and
    a light modulation unit for modulating light in accordance with image information,
    wherein respective lights projected from the respective lens cells of the second lens array are superimposed on the light incidence plane of the light modulation unit.

9. A projector comprising:
    an integrator type illumination optical system according to claim 6; and
    a light modulation unit for modulating light in accordance with image information,
    wherein respective lights projected from the respective lens cells of the second lens array are superimposed on the light incidence plane of the light modulation unit.

10. A projector comprising:
    an integrator type illumination optical system according to claim 5, and
    a light modulation unit for modulating light in accordance with image information,
    wherein respective lights projected from the respective lens cells of the second lens array are superimposed on the light incidence plane of the light modulation unit.

11. A projector comprising:
    an integrator type illumination optical system according to claim 1; and
    a light modulation unit for modulating light in accordance with image information,
    wherein respective lights projected from the respective lens cells of the second lens array are superimposed on the light incidence plane of the light modulation unit.

12. An integrator type illumination optical system comprising:

a first lens array consisting of a plurality of lens cells arranged into a matrix in a column direction and a line direction;

a second lens array consisting of a plurality of lens cells, which correspond to the respective lens cells of the first lens array, wherein the first lens array is constituted by three column groups consisting a left column group, a center column group and a right column group, the thickness of the lens cells included in the center column group is thinner than that of the lens cells included in other column groups, the lens cells included in the left column group and the right column group are formed such that the thickness of the lens cells in each column group increases gradually from the innermost column to the outermost column in each group, the respective lens cells of the second lens array have shapes that are capable of forming images of the respective lens cells of the first lens array on the object to be illuminated, the center column group of the first lens array consists of two columns, each of the left and right column groups consists of two columns of an outer column and an inner column arranged respectively on outer side and inner side of the first lens array, an optical axis of each lens cell constituting each outer column in the left column group and the right column group passes through a position apart outside from a center of the lens cell, an optical axis of each lens cell constituting each inner column in the left column group and the right column group passes through a position on an adjacent lens cell in the respective outer column and apart from inside a center of the adjacent lens cell, and an optical axis of each lens cell in the center column group passes through a position apart inside from a center of the lens cell.

13. The integrator type illumination optical system according to claim 12, wherein the width of each lens cell constituting inner columns of the second lens array, which correspond to the inner columns in the left lens column group and the right lens column group of the first lens array, is larger than the width of each lens cell constituting adjacent lens columns of the second lens array.

14. The integrator illumination optical system according to claim 13, wherein an optical axis of each lens cell constituting outer columns of the second lens array, which correspond to the outer columns of the first lens array, passes through a position apart inside from a center of the lens cell, an optical axis of each lens cell constituting inner columns of the second lens array, which correspond to the inner columns of the first lens array, passes through a position apart inside from a center of said lens cell, and an optical axis of each lens cell in a center column group of the second lens array, which correspond to the center column group of the first lens array, passes through a position apart outside from a center of the lens cell.

15. A projector comprising:

an integrator type illumination optical system according to claim 14; and a light modulation unit for modulating light in accordance with image information, wherein respective lights projected from the respective lens cells of the second lens array are superimposed on the light incidence plane of the light modulation unit.

16. A projector comprising:

an integrator type illumination optical system according to claim 13, and a light modulation unit for modulating light in accordance with image information, wherein respective lights projected from the respective lens cells of the second lens array are superimposed on the light incidence plane of the light modulation unit.

17. A projector comprising:

an integrator type illumination optical system according to claim 12; and a light modulation unit for modulating light in accordance with image information, wherein respective lights projected from the respective lens cells of the second lens array are superimposed on the light incidence plane of the light modulation unit.

* * * * *